(12) United States Patent
Yang et al.

(10) Patent No.: US 10,746,696 B2
(45) Date of Patent: Aug. 18, 2020

(54) SELF-CALIBRATED HEAVY METAL DETECTOR

(71) Applicant: Analog Devices, Inc., Norwood, MA (US)

(72) Inventors: Chen Yang, Lexington, MA (US); Yumeng Liu, Burlington, MA (US); Li Chen, Belmont, MA (US); Kuang L. Yang, Newton, MA (US)

(73) Assignee: Analog Devices, Inc., Norwood, MA (US)

( * ) Notice: Subject to any disclaimer, the term of this patent is extended or adjusted under 35 U.S.C. 154(b) by 577 days.

(21) Appl. No.: 15/383,415

(22) Filed: Dec. 19, 2016

(65) Prior Publication Data

US 2018/0172631 A1 Jun. 21, 2018

(51) Int. Cl.
*G01N 27/447* (2006.01)
(52) U.S. Cl.
CPC . *G01N 27/44791* (2013.01); *G01N 27/44743* (2013.01)
(58) Field of Classification Search
CPC ........... G01N 33/1813; G01N 27/4473; G01N 27/44791
See application file for complete search history.

(56) References Cited

U.S. PATENT DOCUMENTS

| 5,545,303 | A | 8/1996 | Schasfoort et al. |
| 7,261,801 | B2 | 8/2007 | Särme et al. |
| 8,030,092 | B2 | 10/2011 | Guzman |
| 2002/0067174 | A1* | 6/2002 | McAllister ............. G01N 27/06 324/690 |
| 2003/0027354 | A1 | 2/2003 | Geli |
| 2007/0261961 | A1* | 11/2007 | Gassmann ....... G01N 27/44743 204/451 |

(Continued)

FOREIGN PATENT DOCUMENTS

| CN | 1804607 A | 7/2006 |
| CN | 1804633 A * | 7/2006 |

(Continued)

OTHER PUBLICATIONS

N. J. Petersen, et al., On-Chip electro membrane extraction, Microfluid Nanofluid, vol. 9, pp. 881-888 (2010).*

(Continued)

*Primary Examiner* — Maris R Kessel
(74) *Attorney, Agent, or Firm* — Wolf, Greenfield & Sacks, P.C.

(57) ABSTRACT

A microfluidic ion detector for detecting heavy metal ions in liquid and particulate matter from gas samples is described. The microfluidic ion detector includes a sample extraction structure for extracting sample ions from a sample liquid or extracting sample ions from the particulate matter of a gas sample, a separation structure for separating sample ions of different types once extracted, and a detection structure for detecting the sample ions. The microfluidic ion detector also includes a reference reservoir providing a reference ion against which the sample may be calibrated based on the operation of the separation structure. A portable, self-calibrating ion detector may be realized by including the described components on a single substrate.

20 Claims, 8 Drawing Sheets

(56) References Cited

U.S. PATENT DOCUMENTS

| | | | |
|---|---|---|---|
| 2016/0245778 A1 | | 8/2016 | Shimura et al. |
| 2017/0110307 A1* | | 4/2017 | Mellors .............. H01J 49/0459 |

FOREIGN PATENT DOCUMENTS

| | | |
|---|---|---|
| CN | 101435807 A | 5/2009 |
| CN | 104267073 A | 1/2015 |
| CN | 204287209 U | 4/2015 |
| CN | 105223259 A | 1/2016 |
| KR | 10-0741270 B1 | 7/2007 |
| KR | 10-2010-0055664 A | 5/2010 |
| TW | 200742767 A | 11/2007 |

OTHER PUBLICATIONS

M. D. Ramos Payan, et al., Nano-electromembrane extractions, Analytica Chimica Acta, vol. 785, pp. 60-66 (2013) (Year: 2013).*

N. J. Petersen, et al., On-Chip Electro Membrane Extraction with Online Ultraviolet and Mass Spectrometric Detection, Anal. Chem. vol. 83, 44-51 (2011) (Year: 2011).*

International Search Report and Written Opinion dated Apr. 18, 2018 in connection with International Application No. PCT/US2017/067182.

Kiplagat et al., Trace determination of perchlorate using electromembrane extraction and capillary electrophoresis with capacitively coupled contactless conductivity detection. Electrophoresis. Jun. 16, 2011;32:3008-15.

[No Author Listed], Determination of Inorganic Cations by Capillary Electrophoresis. Dionex Corporation. Application Note 91. 1994; 6 pages.

Davarani et al., Electomembrane extraction combined with gas chromatography for quantification of tricyclic antidepressants in human body fluids. Analytica Chimica Acta. 2012;725:51-6.

Kidd et al., Ion Chromatography-on-a-Chip for Water Quality Analysis. 45 International Conference on Environmental Systems. Jul. 12-16, 2015; 8 pages.

Kohler et al., Microextraction techniques combined with capillary electrophoresis in bioanalysis. Analytical and Bioanalytical Chemistry. 2013;405:125-41.

Lin et al. Sample preconcentration in microfluidic devices. Microfluidics and Nanofluidics. 2011;10(3):481-511.

Pastuszka et al., Characterization of PM10 and PM2.5 and associated heavy metals at the crossroads and urban background site in Zabrze, Upper Silesia, Poland during the smog episodes. Environ Monit Assess. 2010;168:613-27.

Tan et al., Determination of Heavy Metal Ions by Capillary Electrophoresis with Contactless Conductivity Detection after Field-amplified Sample Injection. Analytical Sciences. Aug. 2005;21:955-8.

International Preliminary Report on Patentability dated Jul. 4, 2019 in connection with International Application No. PCT/US2017/067182.

* cited by examiner

SELF-CALIBRATED HEAVY METAL DETECTOR

FIELD OF THE DISCLOSURE

The present application relates to microfluidic ion detectors.

BACKGROUND

Heavy metals pose a health risk. Exposure to lead, copper, cadmium, and other heavy metal ions are known to cause various negative health consequences. Heavy metals may come from the water and particulate matter smaller than 2.5 microns in the air. Thus the heavy metal ions may be absorbed by the body by drinking polluted water or breathing in air containing particulate matter.

Instrumentation for detecting ions is typically designed for use in a laboratory setting, and is both large and expensive. To date, a consumer product for detecting heavy metals is not available.

SUMMARY OF THE DISCLOSURE

In certain embodiments a microfluidic ion detector for detecting heavy metal ions in liquid and particulate matter from gas samples is described. The microfluidic ion detector includes a sample extraction structure for extracting sample ions from a sample liquid or releasing and extracting sample ions from the particulate matter from a gas sample, a separation structure for separating sample ions of different types once extracted, and a detection structure for detecting the sample ions. The microfluidic ion detector also includes a reference reservoir providing a reference ion against which the sample may be calibrated based on the operation of the separation structure. A portable, self-calibrating ion detector may be realized by including the described components on a single substrate.

In some embodiments, an apparatus for detecting ions from particulate matter in gas sample is provided, that comprises a first sample source to collect the particulate matter and release the ions, a second electro membrane extraction source, a fluidic channel connecting the first and second electro membrane extraction sources, and electrodes configured to apply an electric field along the fluidic channel.

In some embodiments, a method of detecting ions in a liquid or gas sample is provided, comprising extracting a target ion from the liquid or releasing and extracting a target ion from particulate matters in gas sample using electro membrane extraction, extracting a reference ion from a reference source using electro membrane extraction, and performing capillary electrophoresis on the target ion and the reference ion to move the target ion and the reference ion along a common channel to a detection region.

In some embodiments, a portable microfluidic heavy metal ion detector is provided, comprising a substrate, first and second electro membrane extraction sources integrated on the substrate and joined to a common microfluidic channel, a buffer reservoir joined to the common microfluidic channel, a detector integrated on the substrate, and drive electrodes configured to drive a buffer from the buffer reservoir to the detector along the common microfluidic channel.

BRIEF DESCRIPTION OF THE DRAWINGS

Various aspects and embodiments of the application will be described with reference to the following figures. It should be appreciated that the figures are not necessarily drawn to scale.

DETAILED DESCRIPTION

Aspects of the present application provide a microfluidic detector for detecting ions, such as heavy metal ions. The microfluidic ion detector uses electro membrane extraction to extract ions from a liquid or gas sample. These sample ions are then driven down a microfluidic channel to a detection region by application of a suitable electric field. A detector at the detection region detects the presence of the sample ions. The detector is a capacitive detector in some situations, such that a change in impedance arises and is detected when the sample ions pass through the detection region. Thus, aspects of the present application provide a microfluidic detector which uses electro membrane extraction for extracting sample ions from a sample, capillary electrophoresis for separating the sample ions into different types, and capacitive detection to detect the sample ions.

In some embodiments, the microfluidic detector uses a reference ion to provide self-calibration. The reference ion may be of a type with known electrophoretic mobility relative to the possible sample ions, meaning that the relative speeds of the sample and reference ions as they travel down a microfluidic channel to the detection region may be known. Thus, the reference and sample ions may be distinguished by the detector based on their arrival time at the detector.

In some embodiments, the microfluidic detector includes microfabricated components integrated on a common (the same) substrate. That is, a single substrate microfluidic ions detector may be provided, including electro membrane extraction, capillary electrophoresis, and capacitive detection structures. Such a configuration may be referred to herein as providing "on-chip" electro membrane extraction, capillary electrophoresis, and capacitive ion detection. The use of a reference ion as described above may allow for the single substrate ion detector to be self-calibrating. Moreover, the ion detector may be sized to be portable.

Figure 1:
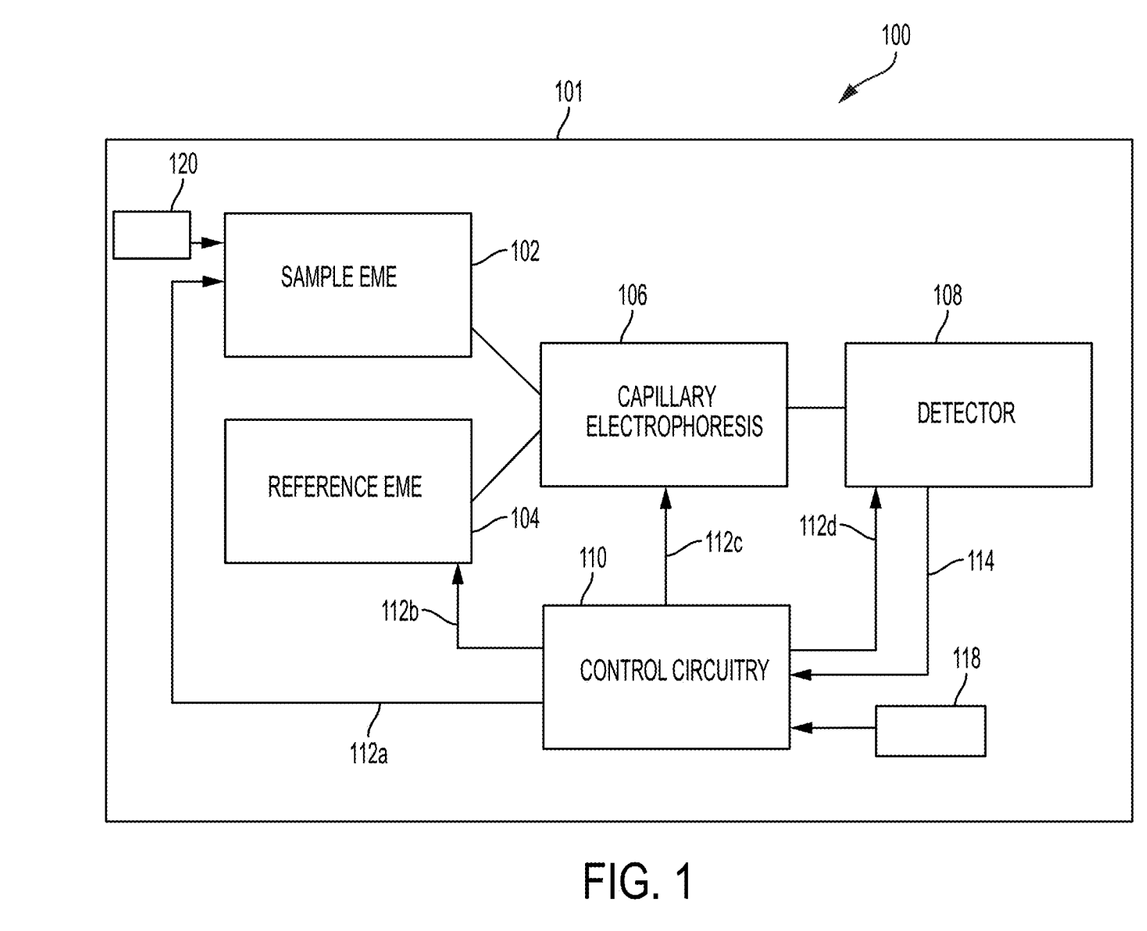
FIG. 1 is a block diagram illustrating a microfluidic ion detector having interconnected electro membrane extraction (EME), capillary electrophoresis, and detection structures, according to a non-limiting embodiment of the present application.

FIG. 1 is a block diagram illustrating a microfluidic ion detector having interconnected electro membrane extraction, capillary electrophoresis, and detection structures, according to a non-limiting embodiment of the present application. The ion detector 100 comprises a substrate 101, a sample electro membrane extraction source 102, a reference electro membrane extraction source 104, a capillary electrophoresis structure 106, a detector 108, and control circuitry 110.

The substrate 101 may be a semiconductor substrate on which the other components of the ion detector 100 may be integrated. For example, the substrate 101 may be a material in which microfluidic channels, electrodes, and/or sample reservoirs may be formed. In some embodiments, the substrate 101 may be a silicon substrate, although alternative materials are possible. In some embodiments, the ion detector 100 may be portable, dimensioned to allow for such portability. For example, the ion detector may take the form of a consumer product which users can easily carry with them. In some embodiments, the substrate may have an area of between 2 cm$^2$ and 50 cm$^2$, including any value within that range. Other values are also possible, as not all embodiments of the present application are limited to the ion detector being portable.

Figure 2:
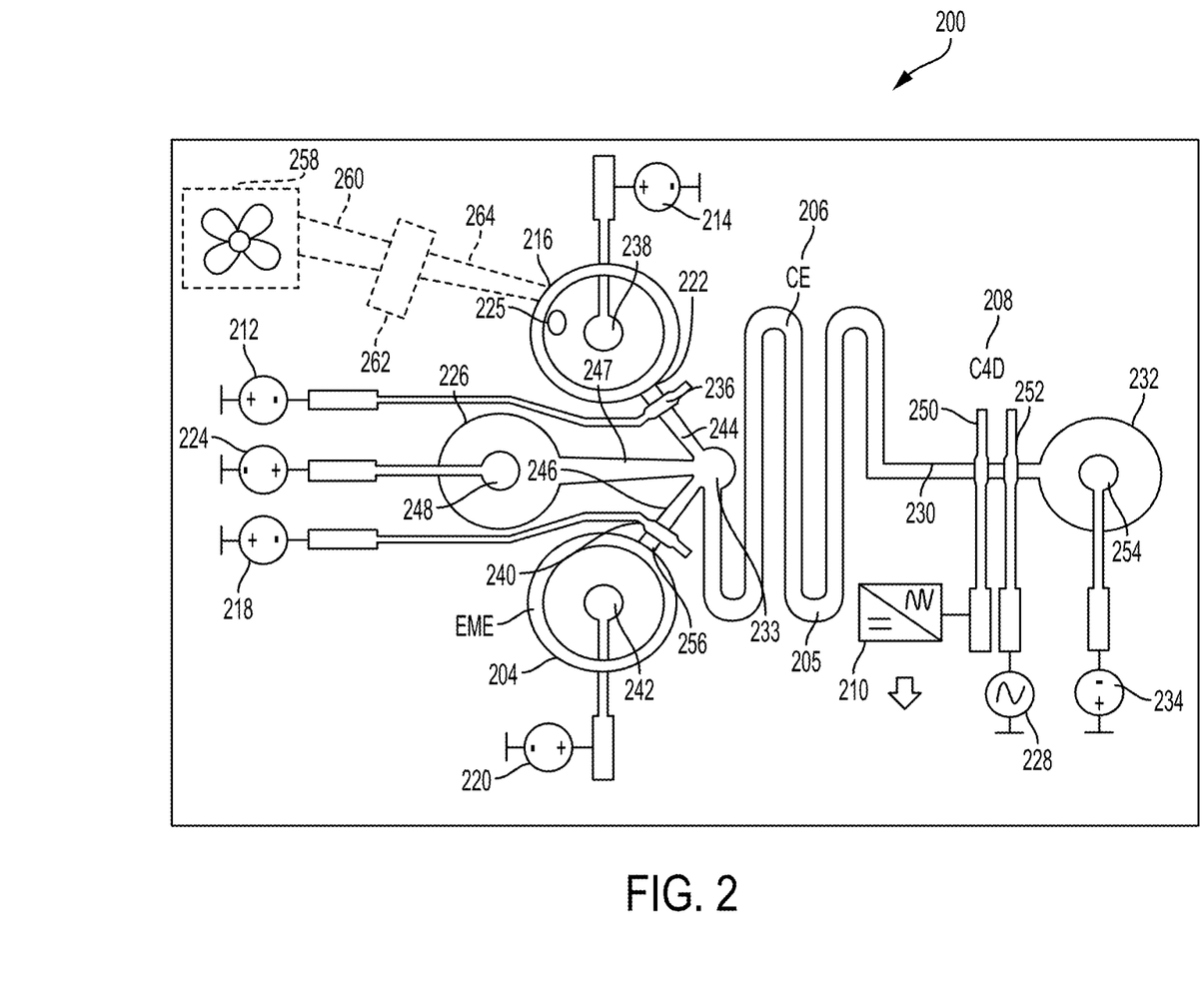
FIG. 2 is a detailed illustration of a microfluidic ion detector of the type illustrated in FIG. 1, according to a non-limiting embodiment of the present application.

The sample electro membrane extraction source 102 may be a structure suitable for holding (or containing) a liquid or converting (or dissolving) a gas sample into a liquid phase, and for extracting sample ions from the sample using electro membrane extraction techniques. In some embodiments, the sample electro membrane extraction source 102 includes a membrane and electrodes configured to apply an electric field across the membrane. An example is shown in FIG. 2 and described further below. The sample electro membrane extraction source 102 may include a reservoir configured to hold the sample. An inlet to the sample electro membrane extraction source 102 may be provided to allow it to be filled with the sample, for example by an end user. In some embodiments, the sample electro membrane extraction source 102 may be microfabricated on the substrate 101.

The ion detector 100 optionally includes a fan 120 coupled to the sample electro membrane extraction source 102. The fan 120 may be included when the sample is a gas, such as an air sample. The fan 120 may provide the gas sample containing the particulate matter to the EME structure for collecting the particulate matter of the gas sample. The EME source may dissolve and release the ions into liquid phase for extraction. A fan is one example of a manner of introducing a gas sample, but it should be appreciated that other structures for introducing a gas sample may be used in alternative embodiments.

The reference electro membrane extraction source 104 may be a structure suitable for holding (or containing) a liquid having a known type of ion, and for extracting the known type of ion from the liquid using electro membrane extraction techniques. In some embodiments, the reference electro membrane extraction source 104 may be substantially the same type of structure as the sample electro membrane extraction source 102, with the difference being the liquid held by the two. Thus, for example, the reference electro membrane extraction source 104 may include a membrane and electrodes configured to apply an electric field across the membrane. An example is shown in FIG. 2 and described further below. The reference electro membrane extraction source 104 may include a reservoir configured to hold the reference liquid. In some embodiments, an inlet to the reference electro membrane extraction source 104 may be provided to allow it to be filled. However, not all embodiments are limited in this respect since the reference electro membrane extraction source 104 is intended to hold a reference liquid. In some embodiments, the reference electro membrane extraction source 104 may be filled during manufacture of the ion detector 100, and thus provision of an inlet for later filling of the reference electro membrane extraction source 104 may optionally be avoided. In operation, a user (e.g., a consumer) may fill only the sample electro membrane extraction source 102 with a sample, the reference electro membrane extraction source 104 having been filled during manufacture. However, alternative manners of filling the two sources 102 and 104 are possible. In some embodiments, the reference electro membrane extraction source 104 may be microfabricated on the substrate 101.

It should be appreciated from the foregoing discussion that in at least some embodiments the sample and reference electro membrane extraction sources 102 and 104 may be substantially the same from a structural standpoint. The difference between the two may be in the liquids they hold and on which they operate. Thus, in some embodiments an ion detector is provided having two or more electro membrane extraction sources, which may be microfabricated on a common substrate in some embodiments.

The capillary electrophoresis structure 106 may include a microfluidic channel, a source of a buffer solution (referred to herein simply as a "buffer"), and electrodes configured to apply an electric field (also referred to herein as "a capillary electrophoresis electric field") to drive the ions in the buffer solution from the source to the detector 108. The channel may be connected to, and shared by, the sample electro membrane extraction source 102 and the reference electro membrane extraction source 104. Thus, the sample ions provided by the sample electro membrane extraction source 102 and the reference ions provided by the reference electro membrane extraction source 104 may be provided to a common point or inlet of the microfluidic channel. In some embodiments, an additional microchannel is provided between the sample electro membrane extraction source 102 and the capillary electrophoresis structure 106 to allow the extracted sample ions to enter the channel of the capillary electrophoresis structure 106, and likewise an additional microchannel is provided between the reference electro membrane extraction source 104 and the capillary electrophoresis structure 106 to allow the extracted reference ions to enter the channel of the capillary electrophoresis structure 106. The channel length of the capillary electrophoresis structure 106 may be between 0.5 cm to 50 cm or any value in between, as a non-limiting example. As described, the capillary electrophoresis structure 106 may additionally include a source of a buffer. The source may be a well, reservoir, or other suitable structure. The electrodes of the capillary electrophoresis structure 106 may be configured to drive the ions in the buffer from the source along the microchannel of the capillary electrophoresis structure to the detector 108.

As previously described, aspects of the present application provide on-chip electro membrane extraction (EME) and capillary electrophoresis (CE) structures. Thus, in some embodiments, the capillary electrophoresis structure 106 may be microfabricated on the substrate 101. Thus, such structures may have microfabricated dimensions. For example, microchannels, microelectrodes, and microreservoirs may be used.

The detector 108 may include a channel and a capacitive-sensing detector, such as a capacitively coupled contactless conductivity detector (C4D), although other sensing detectors may be used. The detector 108 may have two electrodes external to the channel that transmit and receive a signal through the channel. The capillary electrophoresis structure 106 may connect to the detector 108 to allow the sample ions and reference ions to enter the detection region.

The control circuitry 110 may include circuitry suitable for controlling operation of the sample electro membrane extraction source 102, reference electro membrane extraction source 104, capillary electrophoresis structure 106, and/or detector 108. For example, the control circuitry 110 may provide control signals 112$a$, 112$b$, 112$c$, and/or 112$d$ to control operation of the components (e.g., control generation of suitable electric fields from the electrodes of those components), as illustrated. Additionally, or alternatively, the control circuitry 110 may include circuitry suitable for processing detection signals 114 produced by and received from the detector 108. The control circuitry may include, but is not limited to, signal generators, clock circuits, filters, amplifiers, and comparators. In some embodiments, the control circuitry 110 is integrated circuitry, for example being an application specific integrated circuit (ASIC). In some embodiments, the control circuitry 110 may be external to the substrate 101.

A non-limiting example of the operation of ion detector 100 is now described. Sample ions may be extracted from a sample reservoir of the sample electro membrane extraction source 102. This extraction may be achieved by having the control circuitry 110 provide control signal 112$a$ to induce an electric field across a membrane of the sample electro membrane extraction source 102, which allows sample ions across. Extraction of reference ions from the reference electro membrane extraction source 104 may be achieved in the same manner in response to the control circuitry 110 providing control signal 112$b$.

The extracted sample ions and reference ions may then be driven to the detector 108 via capillary electrophoresis. For example, control circuitry 110 may apply a control signal 112$c$ to induce a capillary electric field that pushes the extracted sample ions and reference ions away from the electro membrane extraction membranes and into the channels which carry the sample and reference ions into capillary electrophoresis structure 106, which may be filled with a buffer of high electrophoretic mobility. The capillary electric field may have a polarity such that the sample ions, the reference ions, and the buffer in the capillary micro-electrophoresis structure 106 move toward the detector 108. In some embodiments, the buffer contains ions, and in some such embodiments those ions may have a higher electrophoretic mobility than the reference ions, which may have a higher electrophoretic mobility than the sample ions. Not all embodiments are limited in this respect, though. The difference in electrophoretic mobilities may result in the separation of the sample ions and the reference ions when the capillary electric field is applied. Consequently, the sample ions may lag behind the reference ions, which may lag behind the buffer ions, in some embodiments. The greater the length of the microchannel of the capillary electrophoresis structure 106, the greater the separation which may be achieved between the different ions types. Likewise, the greater the electric field magnitude applied by the capillary electrophoresis structure, the greater the separation distance between the ions of different types.

Buffer ions may enter the detector 108 first because they have the highest electrophoretic mobility. In some embodiments, the buffer ions may establish a background (or base level) signal against which the reference and sample ions may be detected. For example, as the buffer ions pass through the channel with the surrounding electrodes of the detector, the detector 108 may record the impedance (or voltage, current, or characteristic of interest), and the recorded impedance may serve as a reference level. This, though, is optional, as not all embodiments use the buffer to establish a baseline signal for detection. Next, the reference ions may enter the detector 108. As the reference ions pass through the channel with surrounding electrodes, the detector 108 may record an associated impedance (e.g., a second impedance level if the buffer ions are used to establish a baseline impedance level). This recorded impedance change may be used to indicate arrival of the reference ions, having known electrophoretic mobility. When the sample ions enter the detector 108 a third impedance may be detected. If more than one sample ion type is present in the sample, then additional detection events (e.g., changes in impedance, voltage, current, or other characteristic) may occur.

The timing of the detection events may provide an indication of what has been detected. For example, the reference ions may be selected to be of a type known to have a higher electrophoretic mobility than the anticipated sample ions. Thus, when a change in impedance (or voltage, current, or other signal characteristic) is initially detected by the detector 108, that detection event can be associated with the reference ions, since they are expected to arrive before any sample ions. Subsequent detection events (e.g., spikes, peaks, or other signatures in the detection signal) may be associated with sample ions. The time lag between detection of the reference ions and the sample ions may allow for determination of the type of sample ions. An example is now described.

Assume that the reference ions are zinc ions. Zinc ions have a known electrophoretic mobility in certain buffer solution. Assume that the sample ions are lead ions, which is not known prior to detection. Lead has a known electrophoretic mobility in certain buffer solution. Knowing the relative electrophoretic mobilities of zinc (the reference in this example) and lead (the sample in this example) allows for determination of the time difference between when those types of ions should be detected, since the microfluidic channel length is also known. The determination may be facilitated by starting the sample and reference ions at the beginning of the capillary electrophoresis channel at the same time. Thus, if, after detection of the reference ions—assumed in this example to be identified by their arriving at the detector first—another detection event (e.g., a spike, peak, or other signature in the detection signal) occurs at the time corresponding to when lead ions would be expected to arrive, then that subsequent detection event may be interpreted as indicating that lead ions are in the sample. If, however, the detection event occurring after detection of the reference ions occurred at a time when it would be expected for chromium ions to arrive, then such a detection event may be interpreted as there being chromium in the sample.

The same concept may be extended to a greater number of sample ions. That is, multiple detection events may occur after detection of the reference ion. The timing of these detection events may allow for determination of multiple types of sample ions. Thus, embodiments of the present application provide a microfluidic ion detector configured to detect multiple types of sample ions from a single sample.

Moreover, the described operation in which the reference ion arrives prior to the sample ions is a non-limiting example. That operation scheme may provide the benefit of simplicity in the determination of the detected ions, but alternatives are possible so long as the relative arrival times of the reference ions and potential sample ions may be determined.

In some embodiments, the control circuitry 110 may include data indicative of the expected arrival times of potential sample ions relative to the reference ions. In this manner, the control circuitry 110 may determine from a given detection event which ion type was responsible for the event. The control circuitry may include memory, registers, a look-up table, or other suitable structures for storing such data.

It should be appreciated that the use of the reference ions in the above-described method serves as a calibration for detection of the sample ions. Because the reference may be stored on the ion detector 100 itself, the ion detector 100 may be self-calibrating. The ion detector 100 may be used in various temperatures and at various times after fabrication and provide accurate detection in spite of temperature fluctuations and aging. In some embodiments, the ion detector 100 includes one or more temperature sensors 118 which provide a sensed temperature to control circuitry 110 to aid in identification of the detected ions, since electrophoretic mobility and arrival time of the ions may depend on temperature. When included, the temperature sensor 118 may be of any suitable type, including a microfabricated temperature sensor integrated on the substrate 101.

Beyond identifying the type of ions in the sample, the ion detector 100 may optionally determine and provide an indication of the concentration of the detected ion. For example, the reference ions may have a known concentration. Thus, detection of the reference ions may provide a baseline signal (e.g., voltage or current signal) against which signals associated with detection of sample ions may be compared. If the detected signal response is greater for the sample ions, that may indicate a greater concentration of sample ions than the known concentration of the reference ions. If the detected signal response is smaller for the sample ions, that may indicate a lower concentration of sample ions than the known concentration of the reference ions. A precise determination of concentration may be made based on comparison of the signal responses.

FIG. 2 is a detailed illustration of a microfluidic ion detector, representing an example of an implementation of the ion detector 100 of FIG. 1. The ion detector 200 includes a sample electro membrane extraction source 216 having sample voltage sources 212 and 214, sample electrodes 236 and 238, a sample membrane 222, and a sample microchannel 244. There is also a reference electro membrane extraction source 204 having reference voltage sources 218 and 220, reference electrodes 240 and 242, a reference membrane 256, and a reference microchannel 246. The ion detector 200 further comprises a buffer reservoir 226 and a buffer microchannel 247 that connects to a capillary electrophoresis structure 206 with a microfluidic channel 205.

The microfluidic channel 205 terminates in a detection region having a capacitive detector 208, which is shown with a signal generator 228, transmit electrode 252, and receive electrode 250. The detector 208 is connected to an exhaust reservoir 232, which has a capillary voltage source 234 and an electrode 254. The buffer reservoir 226 and exhaust reservoir 232 may be considered parts of the capillary electrophoresis structure 206 in some embodiments. The illustrated ion detector 200 also includes control circuitry 210. For ease of illustration, the control circuitry 210 is shown as connected to the detector 208, but may be connected to any of the illustrated components as described above in connection with control circuitry 110 of FIG. 1.

In some embodiments, a gas sample may be used with the ion detector 200, which may optionally include a fan 258 to force gas through a channel 260 and through to a membrane 262. The membrane 262 may be permeable to particulate matter less than a target diameter, such as 2.5 micrometers in diameter, or any other chosen particle diameter. After being filtered through the membrane 262, the particulate matter may pass through channel 264 and enter the sample electro membrane extraction source 216. In one embodiment, the particulate matter may dissolve in an acidic environment in the sample electro membrane extraction source 216.

Whether the sample is a liquid sample or a gas sample, the sample electro membrane extraction source 216 may contain a sample membrane 222 and sample electrodes 236 and 238 that connect to sample voltage sources 212 and 214. An inlet 225 may optionally be provided for filling the reservoir, for example from a topside of the reservoir. The sample electro membrane extraction source 216 may contain unfiltered material in a reservoir. The volume of the reservoir may be between 0.1 µL to 10 µL, as a non-limiting example. The reservoir may contain liquid from the environment or a solution to dissolve particulates from gas. For example, the sample may be a water sample (e.g., tap water), beverage sample, an acidic solution to dissolve particulates from an air sample, or other sample. The sample may include one or more ions of interest, such as one or more heavy metal ions (e.g., copper, cadmium, chromium, or lead). The sample electrodes 214 and 212 may be polarized such that only ions of a chosen or target polarity pass through the membrane 222 and enter the sample microchannel 244.

The reference electro membrane extraction source 204 may contain a reference membrane 256 and reference electrodes 240 and 242 that connect to reference voltage sources 218 and 220, respectively. The reference electro membrane extraction source 204 may include a reservoir, which may contain liquid. The liquid may contain known ions with known electrophoretic mobilities. As an example, the liquid may be a prepared solution containing a known ion (e.g., zinc), and may be filled in the reservoir of the reference electro membrane extraction source 204 during manufacture of the ion detector 200. The reference voltage sources 218 and 220 may have polarities such that reference ions move across the reference membrane 256 and into reference microchannel 246.

The buffer reservoir 226, the microfluidic channels 205, and the exhaust reservoir 232 may contain a buffer. In some embodiments, the buffer ions has high electrophoretic mobility. The buffer electrode 248 may be paired with a capillary electrode 254, which is described below. The buffer microchannel 247 connects the buffer reservoir 226 to the capillary electrophoresis structure 206, and in particular to the microfluidic channel 205.

The capillary electrophoresis structure 206 comprises a microfluidic channel 205. An electric field is established within the microfluidic channel 205 by the buffer electrode 248 and capillary electrode 254, which are connected to buffer voltage source 224 and capillary voltage source 234, respectively. The voltage difference between buffer electrode 248 and capillary electrode 254 may be such that the voltage difference drives the ionic buffer, sample ions, and reference ions through channel 205. In some embodiments, the channel 205 may be curved, such as having the illustrated serpentine shape. In other embodiments, the channel 205 may be straight. The total length of the microfluidic channel 205 may be selected to ensure sufficient spatial separation of the sample and reference ions as they traverse the microfluidic channel to allow for accurate detection by the detector 208. In some embodiments, the microfluidic channel 205 has a total length between 0.5 cm and 50 cm, between 20 cm and 40 cm, or any value or range of values within those ranges. Alternative lengths are also possible.

The detector 208 may be positioned in a detection region 230 of the microfluidic channel 205, and may comprise a transmit electrode 252, a receive electrode 250, a signal generator 228, and control circuitry 210. The signal generator 228 may be an alternating current power source or any other kind of power source suitable for generating a signal to drive the detector 208. The signal generator 228 is connected to transmit electrode 252, which is external to the microfluidic channel 205. Receive electrode 250 is opposite to transmit electrode 252 and also external to microfluidic channel 205. Control circuitry 210 is connected to receive electrode 250 and may comprise any of the types of components described above in connection with control circuitry 110 of FIG. 1, or any other suitable circuit components. In some embodiments, control circuitry 210 includes circuitry suitable for controlling the detector 208 and/or processing a detection signal from the detector 208.

The exhaust reservoir 232 is at the end of the capillary electrophoresis structure, positioned downstream of detector 208. The electric field gradient produced by the buffer voltage source 224 and capillary voltage source 234 may ensure that the sample ions and reference ions travel toward and remain in the exhaust reservoir 232, to prevent backflow in the microfluidic channel 205. Optionally, a fluidic single-direction valve may be included at the entrance of the exhaust reservoir 232 to further prevent against backflow, particularly when the device is powered off.

A non-limiting example of the operation of the ion detector 200 is now provided. A sample, such as an unfiltered liquid sample, is filled in a reservoir of the sample electro membrane extraction source 216. The polarities of sample voltage sources 212 and 214 are selected such that ions in the sample are driven across the membrane 222 and into the sample microchannel 244. Similarly, the reference ions are extracted from the reference electro membrane extraction source 204 and driven into the reference microchannel 246 by suitable application of voltages to electrodes 240 and 242 from the voltage sources 218 and 220.

Buffer voltage source 224 and capillary voltage source 234 energize electrodes 248 and 254, respectively, so the ions of interest, are swept from the buffer reservoir 226 to inlet 233 of microfluidic channel 205 toward the exhaust reservoir 232. The buffer reservoir 226 may contain known buffer ions with high electrophoretic mobility that are characterized beforehand, in some embodiments. After the sample and reference ions have been extracted from their respective sources, they are carried by the buffer into the capillary electrophoresis microfluidic channel 205. The electric field created by buffer voltage source 224 and capillary source 234 induces the separation of particulates based on electrophoretic mobility. The buffer may have the highest electrophoretic mobility, followed by the reference ions, and the sample ions may have the lowest electrophoretic mobility. A longer capillary electrophoresis channel 205 or larger electric field may cause greater spatial separation of the sample ions and reference ions.

The buffer may enter the detection region 230 first. As the buffer passes through the detector 208 surrounded by transmit electrode 252 and receive electrode 250, the control circuitry 210 may measure the conductivity of the buffer ions. The buffer then passes into the exhaust reservoir 232 due to the electric field caused by the buffer voltage source 224 and capillary source 234.

The reference ions, which may have the next highest electrophoretic mobility in some embodiments, undergo the same process as the buffer ions in terms of passing through the detection region 230 and being detected by detector 208. The control circuitry 210 measures the conductivity of the reference ions, then the reference ions pass into the exhaust reservoir 232. The sample ions, of which there may be more than one type in the sample, and which may have the lowest electrophoretic mobility, undergo the same measurement process and the control circuitry 210 records the conductivity of the sample ions in the buffer. The sample ions may also pass into the exhaust reservoir 232. Based on pre-determined calibration data for the reference, the time that the sample ions take to reach the detector will identify what metal ions they are. The change in impedance can also be used to determine a total concentration measurement of target ions in the sample ions, such that a larger change in impedance would correspond with a larger concentration. In one embodiment, the detection range may be between 100 parts per billion and 1 part per billion, or any value in between.

Figure 3A:
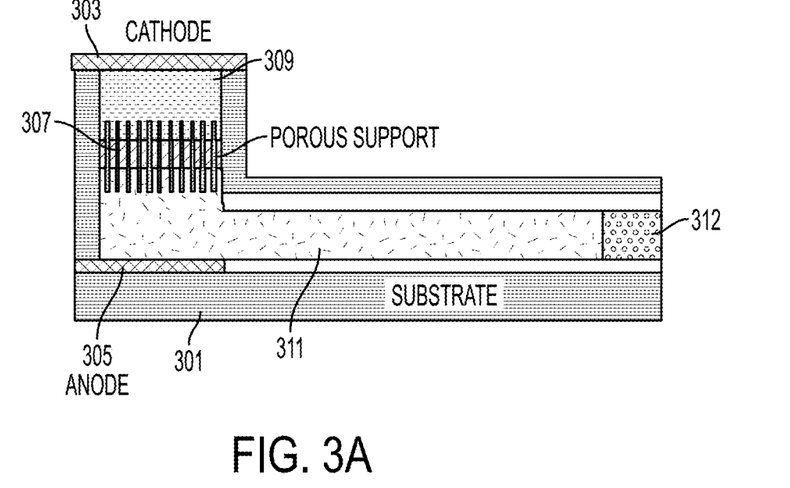
FIG. 3A is a cross-sectional view of an example implementation of the electro membrane extraction structures of FIGS. 1 and 2, according to a non-limiting embodiment of the present application.

FIG. 3A is a cross-sectional view of an example implementation of the electro membrane extraction structures of FIGS. 1 and 2. The electro membrane extraction source may include a cathode 303, an anode 305, a membrane 307, a donor phase 309, and an acceptor phase 311. The cathode 303 and anode 305 may create an electric field that moves ions across the membrane 307 from an unfiltered donor phase 309 (a reservoir with the sample) to an acceptor phase 311. The acceptor phase 311 may include a buffer solution with extracted ions immediately after the membrane 307. In some embodiments, the channel after the membrane 307 is pre-filled with a buffer solution, for example during manufacture of the ion detector. The membrane may allow targeted ions to cross but maintain the sample solution separate from the extracted solution. In one embodiment, the membrane 307 may comprise a hollow fiber membrane. However, other types of porous supports may be used. The electro membrane extraction structures may lead to a microchannel 312 representing an example of sample microchannel 244 and reference microchannel 246. The illustrated electro membrane extraction structure may be formed on substrate 301, which may be a silicon substrate or other suitable material. Thus, microfabrication techniques may be used to form the electro membrane extraction structure shown.

Figure 3B:
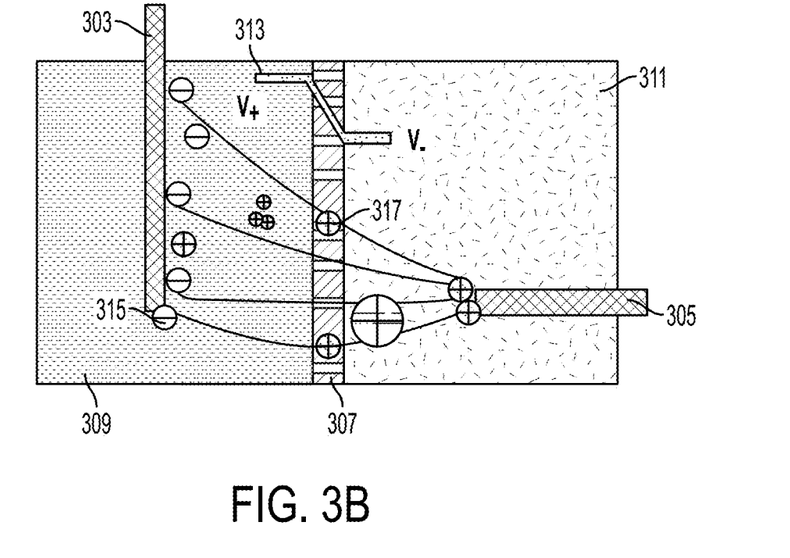
FIG. 3B illustrates the principle of operation of the electro membrane extraction structures described herein.

FIG. 3B is a detailed diagram illustrating the process of electro membrane extraction which may be employed by the electro membrane extraction structures described herein. The process involves a donor phase 309, an acceptor phase 311, a membrane 307, a cathode 303, an anode 305, negatively charged ions 315, positively charged ions 317, and an electric potential gradient 313. The donor phase 309 may represent the unfiltered sample and the acceptor phase 311 may include a solvent. The membrane 307 may separate the phases and prevent mixing. The cathode 303 may be placed on the side of the donor phase 309 and the anode 305 may be placed on the side of the acceptor phase 311. Negatively charged ions 315 and positively charged ions 317 exist in the donor phase 309. The electric potential gradient 313 may be formed by the cathode 303 and anode 305. Negatively charged ions 315 may be attracted to the cathode 303 while positively charged ions 317 may be attracted to the anode 305. The membrane 307 may selectively extract the positively charged ions 317 to the acceptor phase 311 and prevent the donor phase solution from passing through. The extracted positively charged ions 317 may remain in the acceptor phase 311. In this manner, target ions, such as target heavy metal ions, may be extracted from a sample, such as a water sample.

Figure 4A:
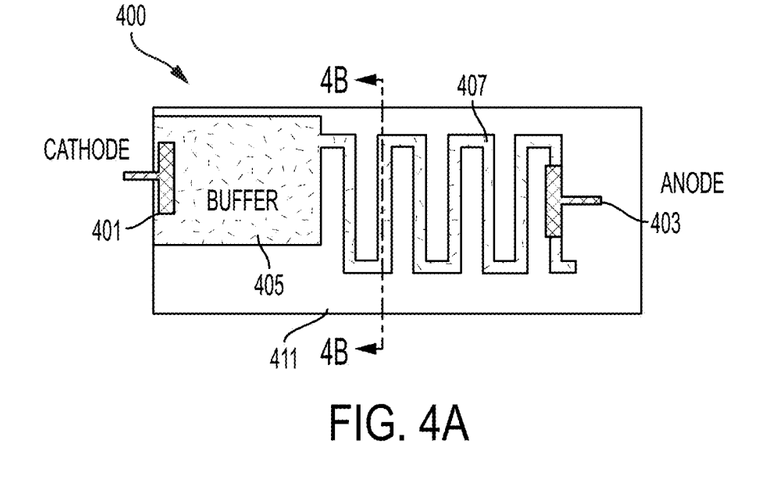
FIG. 4A is a top view of an example implementation of the capillary electrophoresis structures of FIGS. 1 and 2, according to a non-limiting embodiment of the present application.

FIG. 4A shows a diagram of a capillary electrophoresis structure as may be implemented according to aspects of the present application. The capillary electrophoresis structure 400 comprises a cathode 401, an anode 403, a microfluidic channel 407, and a substrate 411. An ionic buffer 405 may be disposed within the channel 407. Capillary electrophoresis may occur by using the cathode 401 and anode 403 to create an electric potential across, or along the channel 407. The ionic buffer 405 may have known positive ions that move toward the anode 403. Ions with higher electrophoretic mobilities will reach the anode 403 faster than ions with lower electrophoretic mobilities, and thus driving the ions from the cathode to the anode will result in spatial separation of different types of ions with different mobilities. In the illustrated example, the ions may travel past the anode 403 and continue to a detector (not shown). In some embodiments, the detector may be positioned between the cathode 401 and anode 403, similar to the configuration shown in FIG. 2. The capillary electrophoresis structure may be fabricated on a single substrate 411.

Figure 4B:
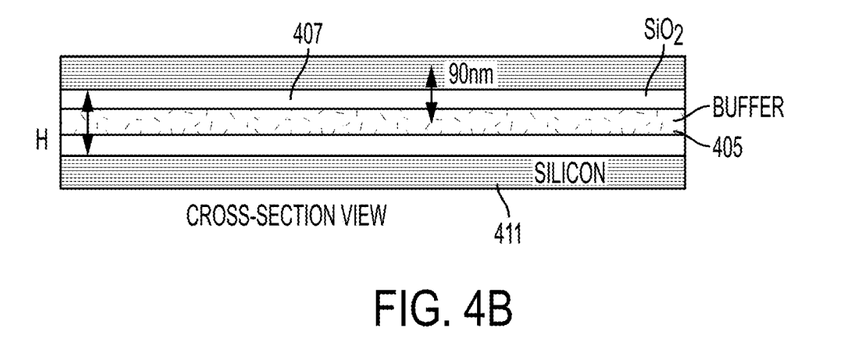
FIG. 4B is a cross-sectional view of the structure of FIG. 4A.

FIG. 4B shows a cross-sectional diagram of one embodiment of a capillary electrophoresis structure, representing a cross section of the structure of FIG. 4A taken along the line 4B-4B. The structure comprises a substrate 411 and a microfluidic channel 407. In one embodiment, the substrate 411 may be silicon. The microfluidic channel 407 may be formed by suitable etching of the silicon, and in some embodiments is lined with silicon dioxide as a hydrophilic and electrically insulated layer. In some embodiments, the microfluidic channel has a height H (parallel to a thickness of the substrate 411) of between 10 µm and 100 µm (e.g., approximately 30 µm, approximately 50 µm, approximately 80 µm, or approximately 90 µm), including any value within that range, although other heights may be used. The ionic buffer 405 may fill the microfluidic channel 407.

Figure 4C:
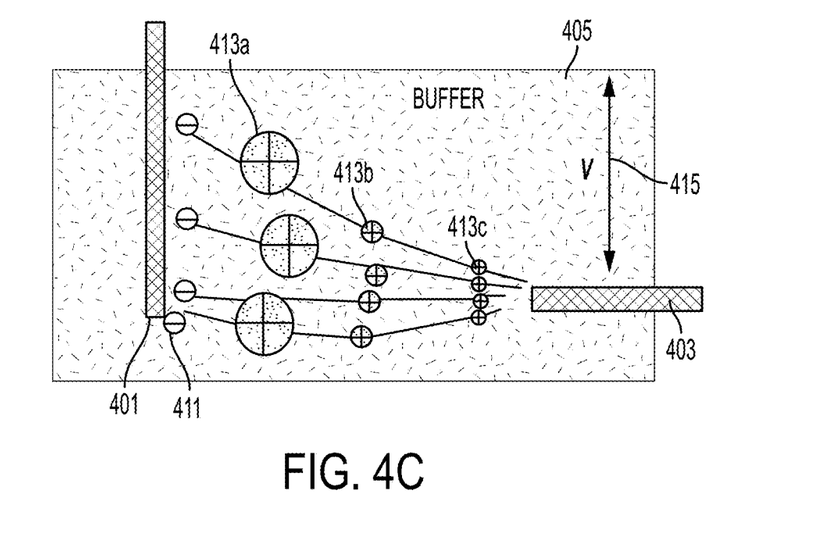
FIG. 4C illustrates the principle of operation of the capillary electrophoresis structures described herein.

FIG. 4C shows a detailed diagram of a capillary electrophoresis process as may be employed by the capillary electrophoresis structures described herein, according to a non-limiting embodiment of the present application. The process involves a cathode 401, an anode 403, an ionic buffer 405, a sample with negative ions 411 and positive ions, and an electric potential difference 415. In this example, three types of positive ions 413a, 413b, and 413c are shown. The cathode 401 and anode 403 create an electric potential difference 415 that may attract positive ions to the anode and negative ions to the cathode. Electrophoretic mobility will determine how quickly positive ions move to the anode. In the illustrated example, ions 413c may have greater electrophoretic mobility than ions 413b, which may have greater electrophoretic mobility than ions 413a. Thus, those three types of ions may arrive at the anode 403 at different times.

Figure 5A:
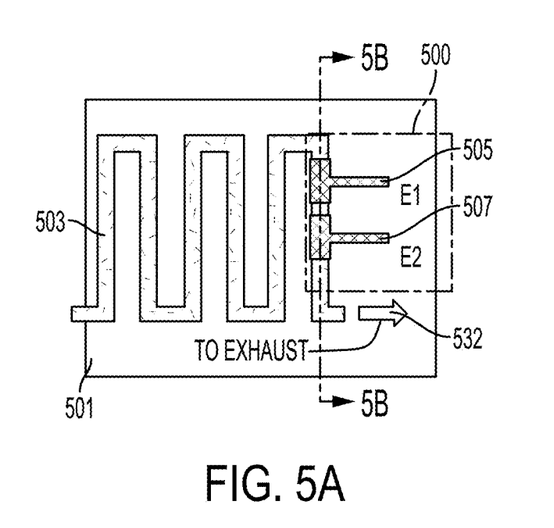
FIG. 5A is a top view of an example implementation of the detection structure of FIGS. 1 and 2, according to a non-limiting embodiment of the present application.

FIG. 5A shows a top view of an example implementation of the detection structure of FIGS. 1 and 2. The illustrated detector 500 is a capacitively coupled contactless conductivity detector (C4D), and comprises a substrate 501, a microfluidic channel 503, a first electrode 505, a second electrode 507, and an exhaust 532. In one embodiment, the first electrode 505 and second electrode 507 may be placed outside of the channel 503, facing each other. The contents of the channel 503 may pass through the section adjacent to or surrounded by the first electrode 505 and second electrode 507 for detection. After detection, the contents of the channel 503 may go to the exhaust 532. The components may be microfabricated on the substrate 501 in some embodiments, which may be any of the types of substrates described herein.

Figure 5B:
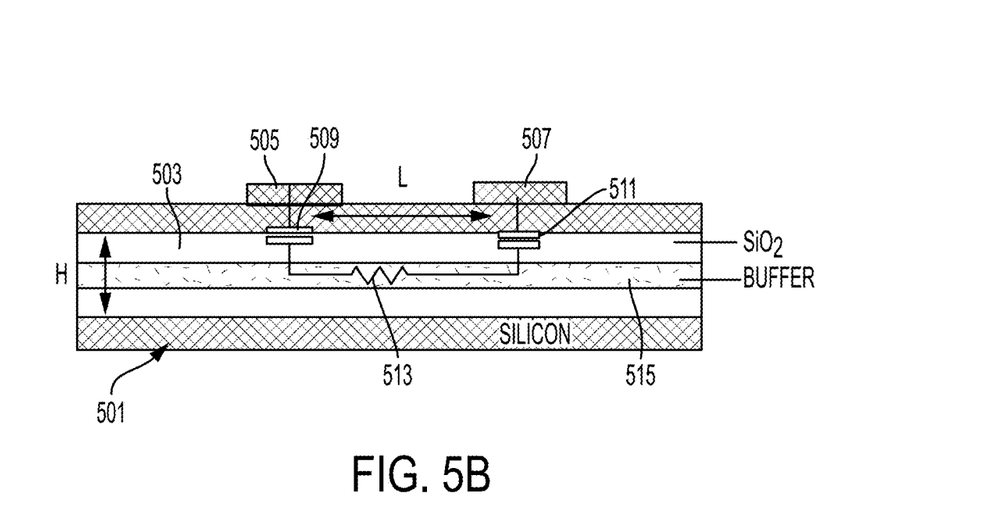
FIG. 5B is a cross-sectional view of the structure of FIG. 5A.

FIG. 5B shows a cross-sectional view of the detector 500 taken along the line 5B-5B of FIG. 5A. The detector 500 comprises a substrate 501, a microfluidic channel 503, a first electrode 505, and a second electrode 507 separated from the first electrode by a length L. A first capacitance 509 is formed between the buffer 515 in the microchannel and the first electrode 505. A second capacitance 511 is formed between the second electrode 507 and the buffer 515. The buffer 515 in the microfluidic channel 503 acts as a resistor 513.

The microfluidic channel 503 may be etched in the silicon substrate and may have a height H having any of the values described above in connection with FIG. 4B. In some embodiments, the channel 503 is lined with or formed in silicon dioxide. However, the various aspects described herein are not limited to the particular materials used to form the channel.

The first electrode 505 and second electrode 507 may be separated by any suitable distance L. In some embodiments, L is less than 50 microns, less than 30 microns, less than 20 microns, less than 10 microns, or any value within such ranges.

In operation, the first electrode 505 may generate a signal which is capacitively coupled through capacitor 509 to the buffer (or other liquid or gas) in the channel 503. This signal is capacitively coupled through capacitor 511 to the second electrode 507. As ions flow through the channel past the electrodes, the impedance may be altered, and the resulting change in the signal from second electrode 507 may be detected.

Figure 5C:
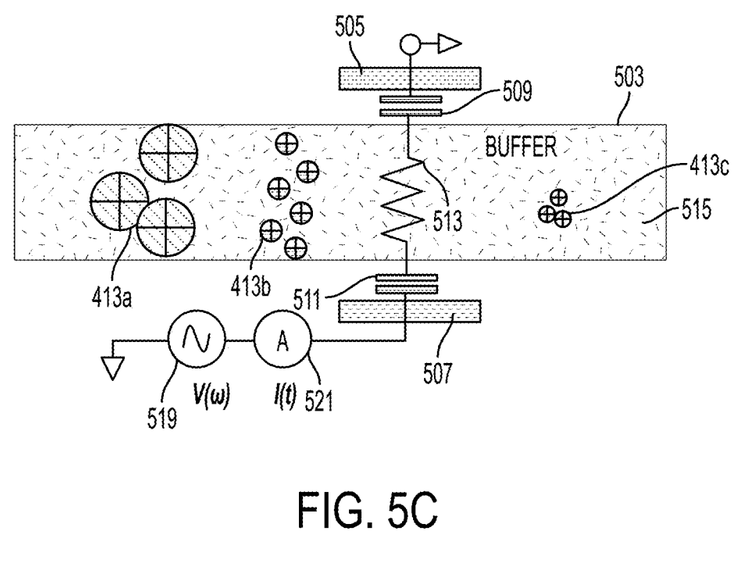
FIG. 5C illustrates the principle of operation of the detection structure of FIGS. 5A and 5B.

FIG. 5C illustrates the principle of operation of the detection structure of FIGS. 5A and 5B. As shown, ions 413a, 413b, and 413c are driven down the channel 503. They are spatially separated due to their different electrophoretic mobilities. In the illustrated example, ions 413c pass through the detector first, followed by ions 413b, and by ions 413a. A voltage signal $V(\omega)$ may be applied and the current $I(t)$ is detected by a current meter (ammeter) 521. As the ions pass between the electrodes 405 and 507, the current signal is altered. The change may be detected, providing an indication that an ion is present.

Figure 6:
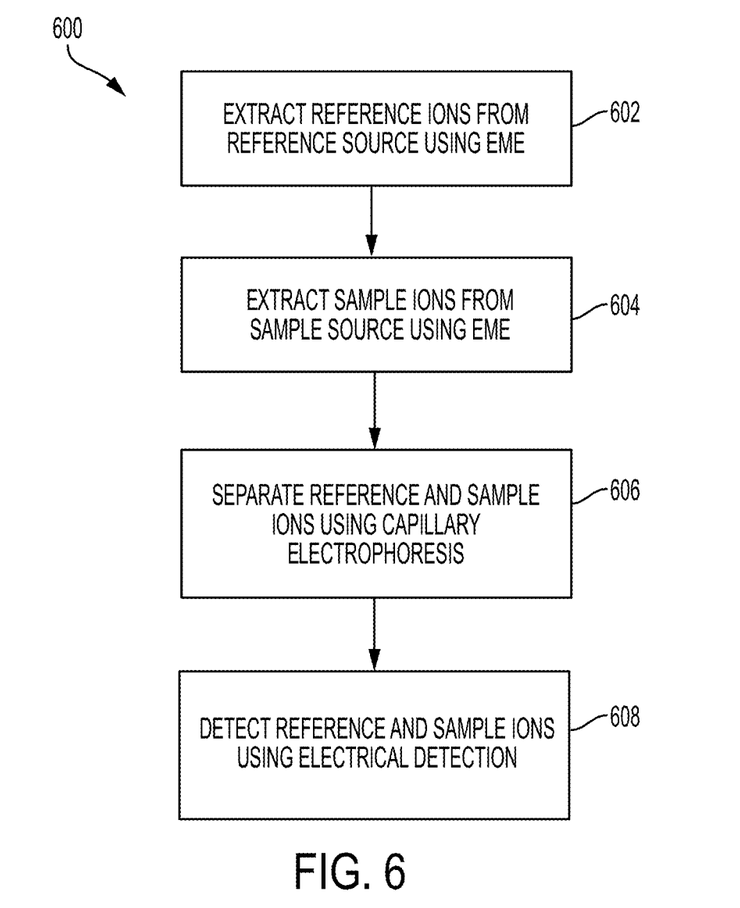
FIG. 6 is a flowchart of a method of operating an ion detector, according to an embodiment of the present application.

FIG. 6 is a flowchart of a method of operating an ion detector, according to an embodiment of the present application. The detector process 600 comprises a reference ion electro membrane extraction stage 602, a sample ion electro membrane extraction stage 604, a capillary electrophoresis stage 606, and a capacitive detection stage 608.

In the reference ion electro membrane extraction stage 602, reference ions may be extracted from a liquid reference source using electro membrane extraction. An applied electric field may drive the reference ions across a membrane from a donor phase to an acceptor phase.

The sample ion electro membrane extraction stage 604 may be proceed in substantially the same manner as stage 602. That is, sample ions may be extracted from a liquid or dissolved gas sample by application of an electric field across a membrane.

In one embodiment, the reference electro membrane extraction stage 602 and the sample electro membrane extraction stage 604 may occur substantially simultaneously, using separate electro membrane extraction systems. The processes may be performed substantially simultaneously to provide the reference ions and sample ions to an inlet to a capillary electrophoresis structure at substantially the same time.

In the capillary electrophoresis stage 606, the extracted reference ions and sample ions enter a channel filled with an ionic buffer. An electric field may be applied across, or along the channel, which drives the ions toward the end of the channel. The speed of the ions is determined by their electrophoretic mobility, so slower ions may be separated from faster ions. In one embodiment, the reference ions may have higher electrophoretic mobility than the sample ions. Reference ions will consequently reach the end of the channel before the sample ions. However, alternative schemes are possible. Also, the sample ions may be of more than one type, such that separation of the different types of sample ions may be achieved during the capillary electrophoresis stage.

The electric field used during the capillary electrophoresis stage may be applied in any suitable manner. In some embodiments, the electric field may be applied continuously. In alternative embodiments, the electric field may be pulsed. In some embodiments, the electric field may be applied at the start of the capillary electrophoresis stage, and subsequently turned off. The ions may proceed through the channel nonetheless owing to the force from the initial application of the field. Reducing the duration of application of the electric field may reduce the power consumed by the ion detector, which may be particularly beneficial when the ion detector is implemented on a single chip having a relatively small size. In some embodiments, the capillary electrophoresis stage may take several seconds to minutes. The duration may depend on multiple factors, including the channel dimensions, the electric field strength and timing, and the buffer characteristics.

In the electrical detection stage 608, the reference and sample ions are detected using an impedance detection technique. For example, capacitively coupled contactless conductivity detection may be used, as described previously in some embodiments.

In some embodiments, three types of ions may be detected, including ions from the buffer, reference ions, and sample ions. Additionally, there may be more than one type of sample ion. The detection may involve analyzing peaks, valleys, or other signatures in a detection signal caused by the change in impedance resulting as ions pass through the detector. The order or timing of the signal change (e.g., peak, valley, or other signature) may provide an indication of whether the ion causing the change in the detection signal is a buffer ion, reference ion, or sample ion. Also, the timing may be used to determine the type of sample ions, since the electrophoretic mobilities of various ion types may be known.

The stages of process 600 may be implemented using various structures, such as structures of the types described herein. In some embodiments, all stages of the process 600 are implemented on the same substrate. Thus, an on-chip microfluidic ion detector may be provided which operates in accordance with the process 600, in some embodiments.

Figure 7:
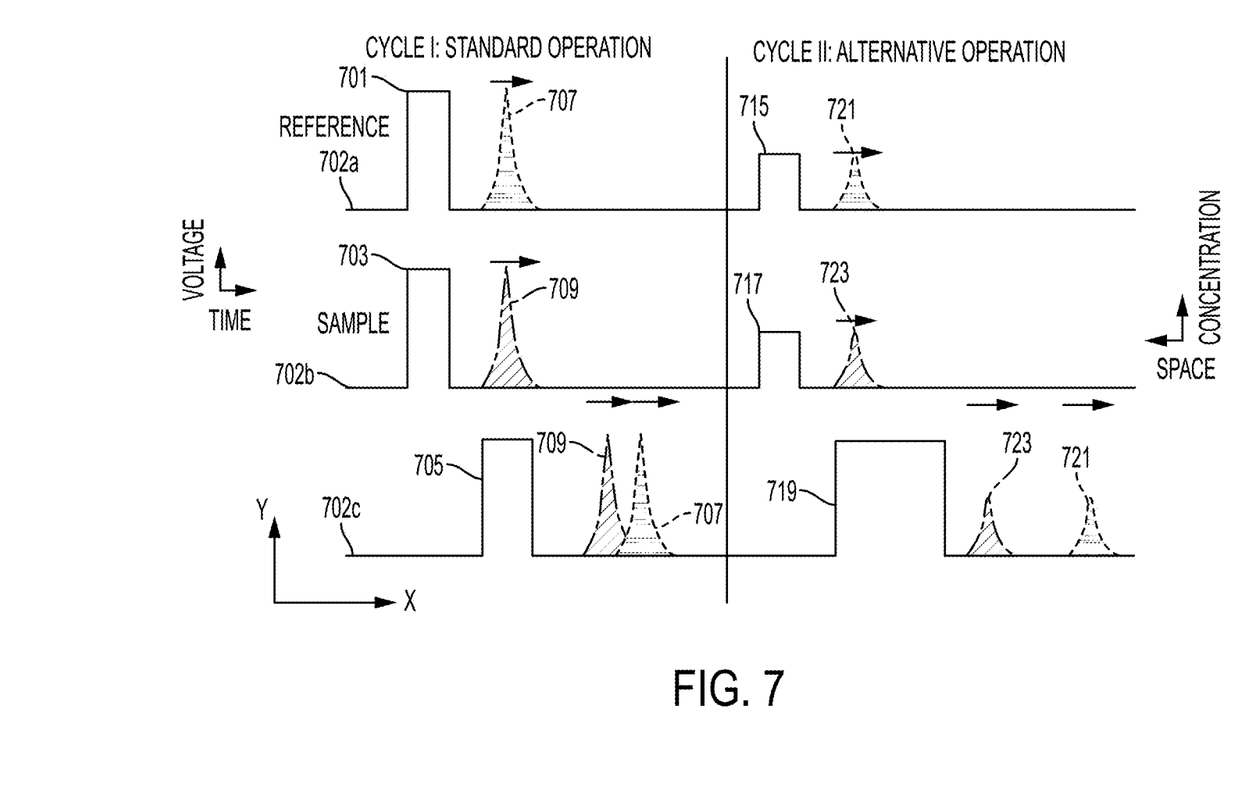
FIG. 7 illustrates timing diagrams for a method of operating an ion detector, according to a non-limiting embodiment of the present application.

FIG. 7 illustrates timing diagrams for a method of operating an ion detector, according to a non-limiting embodiment of the present application. Two types of items are illustrated in overlapping fashion. First, voltage signals are shown, corresponding to voltages applied by electro membrane extraction structures and by a capillary electrophoresis structure. These include signal 702a corresponding to a voltage signal applied by a reference electro membrane extraction structure, signal 702b corresponding to a voltage signal applied by a sample micro-extraction structure, and signal 702c corresponding to a voltage applied by a capillary electrophoresis structure. These signals are shown as voltages as a function of time, with time increasing to the right. The second type of item shown is ion packets (also referred to herein as "ion clusters"). These include reference ions 707 and sample ions 709. These items are shown by concentration (increasing along the y-axis) as a function of distance (increasing along the x-axis). Furthermore, the figure shows two types of operation, including "standard" operation and "alternative" operation.

Considering first the "standard" operation, voltage pulses 701 and 703 may be applied. Those pulses may result in extraction of reference ions 707 and sample ions 709 from a reference electro membrane extraction source and a sample electro membrane extraction source, respectively. It can be seen that the pulses 701 and 703 may be applied at substantially the same time. In this manner, the reference ions and sample ions may be provided to the inlet of a capillary electrophoresis structure at substantially the same time.

Subsequently, voltage pulse 705 of the capillary electrophoresis signal 702c may be applied. This pulse may cause the reference ions 707 and sample ions 709 to proceed down a microchannel of the capillary electrophoresis structure. In this example, it is assumed that the reference ions have greater electrophoretic mobility than the sample ions, and therefore proceed in front of the sample ions.

While it is shown that pulses 701 and 703 may be applied at substantially the same time, this manner of operation is optional. The initiation of the electrophoresis process may be controlled by the voltage pulse 705, and thus it is possible to provide pulse 701 and 703 at different times than each while still having the reference and sample ions provided to the inlet of the capillary electrophoresis structure prior to voltage pulse 705 occurring. Stated another way, the reference and sample ions may be aligned by application of voltage pulse 705.

The "alternative" operation illustrates a situation in which the reference electro membrane extraction signal 702a and sample electro membrane extraction signal 702b have smaller voltage pulses 715 and 717, respectively, than under the "standard" operation scheme. Still, the pulses 715 and 717 may be of substantially the same magnitude as each other and applied substantially simultaneously. As can be seen, the resulting extracted reference ions 721 and sample ions 723 have smaller concentrations than reference ions 707 and sample ions 709. Under this operating scheme, the capillary electrophoresis signal 702c may be pulsed for a greater duration with pulse 719 than was used for pulse 705. This greater duration may produce sufficient spatial separation between the reference ions 721 and sample ions 723 to allow their separate detection, despite the concentrations being smaller than under the standard operating scenario.

Thus, it should be appreciated from FIG. 7 that the applied voltage and durations used for electro membrane extraction and capillary electrophoresis may be varied to provide desired operation of the ion detector. In some embodiments, the operating scheme may be selected to provide lower power operation.

As should be appreciated from the foregoing description, aspects of the present application provide microfluidic ion detectors. The ion detectors may be self-calibrating and robust, capable of operating under various environment conditions and after varying period of disuse. The ion detector may be fully microfabricated in some embodiments, providing on-chip electro membrane extraction, capillary electrophoresis, and capacitive detection functionalities. The self-calibration achieved from using a reference ion may facilitate use of the device as a consumer product, for example for testing air and water samples in homes, businesses, or other locations. Moreover, the ion detector may be sized to facilitate portability. Low power operation may be provided, further facilitating cost-effective use as a consumer product.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. An apparatus for detecting ions, comprising:
   a first electro membrane extraction source integrated on a substrate and comprising a first membrane and a first pair of extraction electrodes disposed on opposite sides of the first membrane;
   a second electro membrane extraction source integrated on the substrate and comprising a second membrane and a second pair of extraction electrodes disposed on opposite sides of the second membrane;
   a fluidic channel integrated on the substrate and connecting the first and second electro membrane extraction sources to a detection region; and
   drive electrodes configured to apply an electric field along the fluidic channel.

2. The apparatus of claim 1, further comprising a capacitively coupled contactless conductivity detector positioned at the detection region.

3. The apparatus of claim 2, wherein the capacitively coupled contactless conductivity detector is integrated on the substrate.

4. The apparatus of claim 2,
   further comprising electronic circuitry coupled to the capacitively coupled contactless conductivity detector and configured to:
   determine a first time at which a first ion is sensed by the capacitively coupled contactless conductivity detector;
   determine a second time at which a second ion is sensed by the capacitively coupled contactless conductivity detector; and
   identify a type to which the first ion is associated based on the first time and the second time.

5. The apparatus of claim 1, wherein the drive electrodes are integrated on the substrate.

6. The apparatus of claim 1, further comprising a third source coupled to the fluidic channel, wherein the drive electrodes are configured to apply the electric field from the third source to the detection region.

7. The apparatus of claim 1, wherein the first electro membrane extraction source comprises an inlet configured to allow filling of the first electro membrane extraction source.

8. The apparatus of claim 1, wherein the fluidic channel is a first fluidic channel, wherein the apparatus further comprises:
   a second fluidic channel coupling the first electro membrane extraction source to the first fluidic channel; and
   a third fluidic channel coupling the second electro membrane extraction source to the first fluidic channel, wherein the second and third fluidic channels intersect the first fluidic channel at a common point.

9. A portable microfluidic heavy metal ion detector, comprising:
   a substrate;
   first and second electro membrane extraction sources integrated on the substrate and joined to a common microfluidic channel that is integrated on the substrate, wherein the first electro membrane extraction source comprises a first membrane and a first pair of extraction electrodes disposed on opposite sides of the first membrane, and the second electro membrane extraction source comprises a second membrane and a second pair of extraction electrodes disposed on opposite sides of the second membrane;
   a buffer reservoir joined to the common microfluidic channel;
   a detector integrated on the substrate; and
   drive electrodes configured to drive a buffer from the buffer reservoir to the detector along the common microfluidic channel.

10. The portable microfluidic heavy metal ion detector of claim 9, wherein the first electro membrane extraction source is fillable and comprises an inlet via which the first electro membrane extraction source is configured to be filled.

11. The portable microfluidic heavy metal ion detector of claim 9, wherein the common microfluidic channel has a serpentine shape.

12. The portable microfluidic heavy metal ion detector of claim 9, wherein the detector is a capacitively coupled contactless conductivity detector.

13. The portable microfluidic heavy metal ion detector of claim 9, further comprising circuitry integrated on the substrate and configured to provide control signals to the first and second electro membrane extraction sources and the detector.

14. The portable microfluidic heavy metal ion detector of claim 9, wherein the reservoir and the drive electrodes are integrated on the substrate.

15. The portable microfluidic heavy metal ion detector of claim 9, further comprising control circuitry storing data identifying different ion types.

16. A portable microfluidic heavy metal ion detector, comprising:
   a substrate comprising:
      a sample reservoir and a reference reservoir;
      a microfluidic channel in fluidic communication with both the sample and the reference reservoirs;
      a first membrane separating the sample reservoir from the microfluidic channel and a second membrane separating the reference reservoir from the microfluidic channel;
      a detector;
      first and second electrodes configured to apply an electric field along the microfluidic channel;

a third electrode disposed on a first side of the first membrane, and a fourth electrode disposed on a second side, opposite the first side, of the first membrane; and a fifth electrode disposed on a first side of the second membrane, and a sixth electrode disposed on a second side, opposite the first side, of the second membrane.

17. The portable microfluidic heavy metal ion detector of claim 16, further comprising a buffer reservoir, wherein the first and second electrodes are configured to drive a buffer from the buffer reservoir to the detector along the microfluidic channel.

18. The portable microfluidic heavy metal ion detector of claim 16, wherein the detector comprises:

seventh and eight electrodes disposed at different locations along the microfluidic channel;

an alternate current (AC) voltage source connected to the seventh electrode; and a current sensor.

19. The portable microfluidic heavy metal ion detector of claim 16, further comprising electronic circuitry coupled to the detector and configured to:

determine a first time at which a first ion is sensed by the detector;

determine a second time at which a second ion is sensed by the detector; and identify a type to which the first ion is associated based on the first time and the second time.

20. The portable microfluidic heavy metal ion detector of claim 19, wherein the electronic circuitry is configured to identify the type to which the first ion is associated based on a difference between the second time and the first time.

* * * * *